US008860245B2

(12) United States Patent
Saxena et al.

(10) Patent No.: US 8,860,245 B2
(45) Date of Patent: Oct. 14, 2014

(54) OPTIMAL UTILIZATION OF POWER CONVERTERS BASED ON THERMAL CHARACTERISTICS

(75) Inventors: Sunit Kumar Saxena, Mississauga (CA); Venkatesan Santhirahasan, Mississauga (CA); Cristian Anghel, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 1448 days.

(21) Appl. No.: 12/146,240

(22) Filed: Jun. 25, 2008

(65) Prior Publication Data

US 2009/0323377 A1 Dec. 31, 2009

(51) Int. Cl.

| | |
|---|---|
| ***B60R 22/00*** | (2006.01) |
| ***F02N 11/04*** | (2006.01) |
| ***F02N 11/10*** | (2006.01) |
| *H02H 5/04* | (2006.01) |

(52) U.S. Cl.

CPC ................ *F02N 11/04* (2013.01); *F02N 11/10* (2013.01)

USPC ......................................... 307/10.6; 361/93.8

(58) Field of Classification Search

USPC ........... 363/276, 275, 284, 285, 50; 361/93.8, 361/94; 307/10.6; 318/101

See application file for complete search history.

(56) References Cited

U.S. PATENT DOCUMENTS

| | | | | |
|---|---|---|---|---|
| 3,775,745 | A * | 11/1973 | Kelley | 340/449 |
| 5,453,904 | A * | 9/1995 | Higashiyama et al. | 361/94 |
| 7,049,798 | B2 * | 5/2006 | Chapuis et al. | 323/282 |
| 7,253,535 | B2 * | 8/2007 | Duesterhoeft | 290/34 |
| 7,348,756 | B2 * | 3/2008 | Ma et al. | 318/803 |
| 7,443,123 | B2 * | 10/2008 | Norell et al. | 318/471 |
| 7,675,759 | B2 * | 3/2010 | Artusi et al. | 363/21.01 |
| 2006/0049795 | A1 | 3/2006 | Iura et al. | |

FOREIGN PATENT DOCUMENTS

JP 2007274868 A 10/2007

OTHER PUBLICATIONS http://www.reliance.com/pdf/drives/instruction_manuals/D23304.pdf p. 74 , Oct. 1994.

* cited by examiner

*Primary Examiner* — Adolf Berhane
*Assistant Examiner* — Henry Lee, III
(74) *Attorney, Agent, or Firm* — Shimokaji & Assoc. P.C.

(57) ABSTRACT

A method and system for utilization of power converters in an aircraft engine start system includes measurement of power converter operation data that is utilized with a mathematical model of the power converter thermal characteristics to calculate operation limits for subsequent start duty cycles. A warning indicator is utilized in the event the start duty cycle limits are exceeded. This invention can be extended for any More Electric Vehicle applications, which utilizes an electric engine start system.

14 Claims, 5 Drawing Sheets

Relationship showing variations of Yt and Gmin with respect to multiple engine start attempt durations X and wait periods G

OPTIMAL UTILIZATION OF POWER CONVERTERS BASED ON THERMAL CHARACTERISTICS

BACKGROUND OF THE INVENTION

The present invention generally relates to apparatus and methods of optimally utilizing power converters and, more specifically, to apparatus and methods of optimally utilizing power converters as part of an engine start system.

Aircraft engines require a start system to generate the mechanical torque required to bring the engine from a stopped state up to a target speed, at which point the engine is considered to have transitioned to a running state. Modern aircraft, such as More Electric Aircraft, have engine start systems that may include an AC power generator, a power converter, and an input power source. For these modern aircraft, during an engine start mode, the generator is operated as a torque-producing motor that uses power supplied at varying voltage and frequency by the power converter. The power converter is supplied with input power from an input power source. When the engine has transitioned from the stopped to the running state, the power converter is disconnected as an AC power supply. In the running state the engine produces mechanical torque which is transformed to AC power by the generator.

Utilization of the power converter as an AC power supply that receives input power can cause the power converter temperature to increase to a level unsafe for continued operation. This increase in temperature necessitates power converter thermal protections which may include operation time limits. Power converters have a rating that specifies limits for their continued operation followed by a minimum wait period. In an existing engine start application for an aircraft, the maximum duration of power converter operation is typically 135 seconds followed by a minimum wait period of 15 minutes. According to these limits, when the power converter has been utilized for the maximum rated duration of 135 seconds, the power converter should not be used for at least the next 15 minutes. The power converter rating serves as a guide to operating the power converter within the power converter operation limits. The power converter operation limits define the onset of thermal damage to the power converter. During engine start mode, the power converter is utilized continuously with input power during each start attempt. Typically current engine start systems do not track the actual operation time of the power converter. The start duty cycle normally expected consists of a single successful start attempt typically having a 40 second duration. The wait period is required so that the temperature of the power converter is reduced. The maximum start duty cycle is defined as the maximum number of consecutive start attempts estimated to occur within the power converter maximum utilization duration followed by the minimum wait period. In an existing engine start application for an aircraft, the maximum number of consecutive start attempts may be three. Thus after three start attempts, the engine start system is required to wait in an idle state for at least 15 minutes before another engine start attempt can be made.

Duty cycle abuse is defined as exceeding the maximum number of start attempts within the fixed maximum start duty cycle duration. When there are unsuccessful starts, it can be expected that the engine start system will encounter duty cycle abuse when the operator attempts multiple starts. In an existing engine start application for an aircraft, duty cycle abuse may be defined as four start attempts without pause, which are caused by consecutive unsuccessful starts. Duty cycle abuse avoidance is used in current engine start systems as a way to prevent exceeding the power converter rating.

Engine start systems that use a maximum start duty cycle based on a fixed number of start attempts are prone to unnecessarily long wait periods. This arises because the actual power converter utilization during the start duty cycle may be less than the estimated utilization. In addition, preventing duty cycle abuse does not necessarily prevent exceeding the power converter rating. This can arise if the actual power converter utilization during the start duty cycle is more than the estimated utilization. Current engine start system maximum start duty cycles can therefore introduce unnecessarily long wait periods while also allowing the power converter rating to be exceeded.

As can be seen, there is a need for a more accurate and efficient power converter utilization method in engine start systems. Additionally there is a need for a power converter utilization method that provides better protection against exceeding the power converter thermal rating. This invention can be extended for any More Electric Vehicle applications, which utilize an electric engine start system.

SUMMARY OF THE INVENTION

In one aspect of the present invention a method of utilizing a power converter comprises the steps of measuring operation data of the power converter and using these data in developing a mathematical model of the power converter thermal characteristics. Further operation data of the power converter is used in conjunction with the mathematical model to calculate power converter operation parameters to be used as the maximum start duty cycle parameters.

In another aspect of the present invention an engine start system includes an indication of the maximum start cycle duty parameters and a warning indication in the event of duty cycle abuse.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method of utilization of a power converter by employing an empirically derived mathematical model of the thermal characteristics of the power converter in conjunction with measured power converter operation data. Other operation data such as ambient temperature, power dissipation, and cooling method may be used in developing the mathematical model. In contrast to the prior art that relies on estimates of the power converter operation data in conjunction with the power converter rating, the present invention produces power converter operation parameters that more closely represent the actual power converter operation limits. As a result, the present invention facilitates shorter wait periods during power converter utilization while more precisely and responsively indicating an occurrence of the power converter rating being exceeded.

The present invention provides a system for utilization of power converters within an aircraft engine start system that may enable the determination of a maximum start duty cycle based on accurate power converter operation parameters. Unlike prior art aircraft engine start systems that define a maximum start duty cycle as a fixed number of start attempts followed by a fixed wait period, the present invention provides maximum start duty cycle limits based on power converter operation parameters that are calculated and updated from actual power converter operation data. As a result, the present invention may enable shorter start system wait periods, resulting in optimal utilization of power converters, and better detection of duty cycle abuse, defined as exceeding the maximum start duty cycle limits, than prior art start systems.

Figure 1:
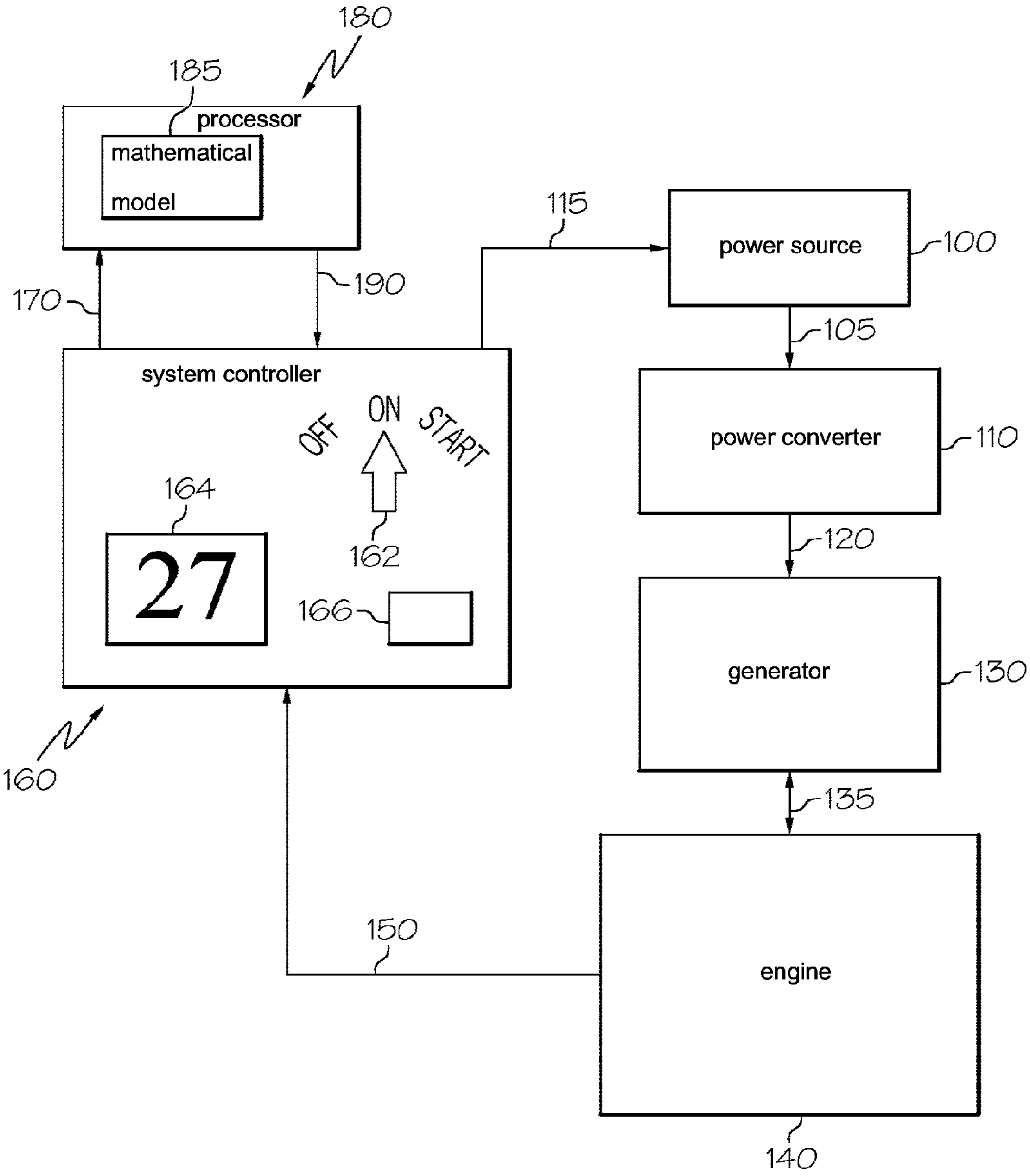
FIG. 1 is a diagram of an engine start system according to the present invention.

In more specifically describing the present invention, and as can be appreciated from FIG. 1, an embodiment of the present invention provides an input power source 100 electrically connected to a power converter 110. The input power source 100 and power converter 110 may receive an operation signal 115 that directs the input power source 100 and power converter 110 to apply or remove the application of AC power 120 to the generator 130. The power converter 110 may receive input power 105 from the input power source 100 and may convert input power 105 to AC power 120. A generator 130 may receive AC power 120. An operation duration of the power converter 110 is defined as the time duration of an application of AC power 120 to the generator 130 by the power converter 110. A wait period of the power converter 110 is defined as the time elapsed since the removal of AC power 120 from the generator 130. The operation data of the power converter 110 may include an operation duration and a wait period.

The generator 130 may operate as a standard electrical generator by producing electrical power from mechanical torque input and may also operate as a motor by producing mechanical torque from AC power 120.

The generator 130 may be mechanically connected to an engine 140. When the engine 140 is in a running state, the engine 140 may produce mechanical torque 135. When the generator 130 is receiving AC power 120, the generator 130 may produce mechanical torque 135 and the mechanical torque 135 may be applied to the engine 140. The application of mechanical torque 135 to the engine 140 may result in an increase in the operating speed of the engine 140. The engine 140 may provide a speed signal 150 that indicates the current value of the operating speed of the engine 140. A system controller 160 may include an engine mode switch 162, a start duty cycle indicator 164, and a duty cycle abuse indicator 166. The engine mode switch 162 may be in one of a plurality of states for controlling the state of the engine 140 including a) OFF for controlling the engine 140 to a stopped state; b) ON for controlling the engine 140 to remain in the running state or the stopped state; and c) START for controlling the engine 140 to transition from the stopped state to the running state.

When the engine mode switch 162 is switched to the START state while the engine 140 is in the stopped state, the system controller 160 may send the operation signal 115 to the input power source 100 and power converter 110 indicating to begin sending AC power 120 to the generator 130. When the speed signal 150 reaches a minimum threshold value while the engine mode switch 162 is in the START state, the engine mode switch 162 can be switched to the ON state.

A start attempt duration is defined as the elapsed time from the engine mode switch 162 switching into the START state to switching out of the START state and is equivalent to an operation duration of the power converter 110. A start attempt wait period is defined as the time elapsed since the engine mode switch 162 was most recently in the START state and is equivalent to a wait period of the power converter 110. It should be noted that when the engine mode switch 162 is in the START state, by definition the start attempt wait period is zero.

The system controller 160 may provide start system operation data 170 to a start duty cycle limits processor 180. The start system operation data 170 includes, but is not limited to, the most recent start attempt duration and the start attempt wait period. The start duty cycle limits processor 180 may include a mathematical model 185 of the thermal characteristics of the power converter 110. The mathematical model 185 may be represented as digital data and stored on a machine-readable medium including a hard drive and an optical disk, as well as being processed on a computer. The start duty cycle limits processor 180 may utilize the mathematical model 185 in conjunction with the start system operation data 170 to calculate power converter 110 operation parameters that may be used to determine start duty cycle limits 190. The start duty cycle limits processor 180 may receive the start system operation data 170 and may determine the start duty cycle limits 190. The start duty cycle limits 190 may be received by the system controller 160 and may be indicated in the start duty cycle indicator 164. The start duty cycle limits 190 may be represented as digital data and stored on a machine-readable medium including a hard drive and an optical disk, as well as being processed on a computer.

Certain electrical components of the present invention including, but not limited to, the speed signal 150, the system controller 160, the operation data 170, the start duty cycle limits processor 180, the mathematical model 185, and the start duty cycle limits 190 may be implemented or represented fully or in various combinations of analog and digital electrical signals and circuitry.

The start duty cycle limits 190 define parameters for the operation of the engine mode switch 162 and may be based on the operation parameters of the power converter 110. The start duty cycle limits 190 parameters may include, but are not limited to, a start attempt wait period until the engine mode switch 162 may be transitioned into the START state and a start attempt duration the engine mode switch 162 may remain in the START state. The duty cycle abuse indicator 166 may indicate operation of the engine mode switch 162 outside the start duty cycle limits 190.

Figure 2:
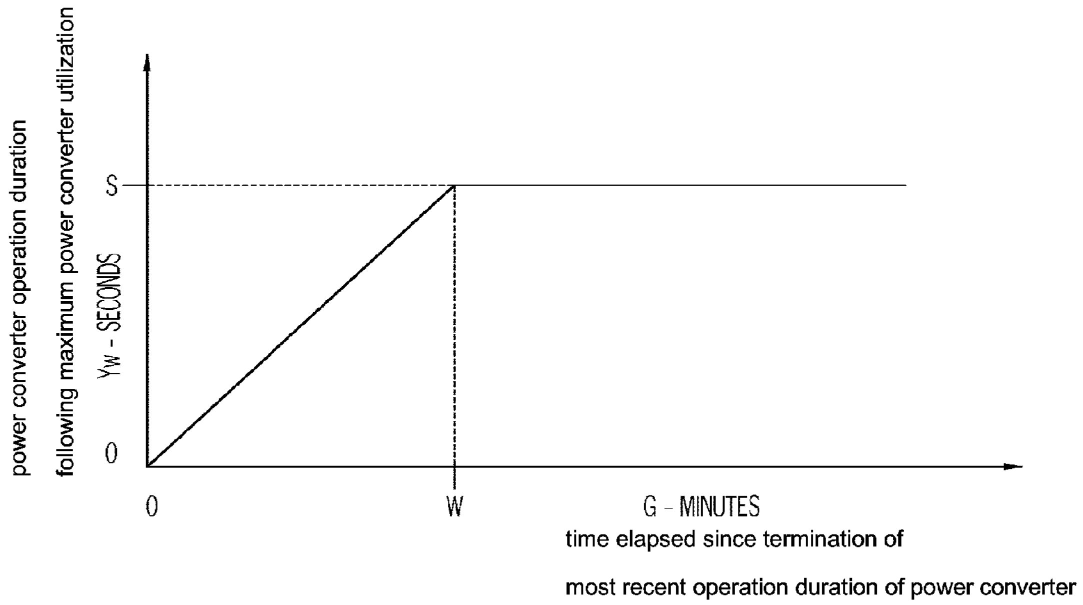
FIG. 2 is a graph of power converter thermal data showing the linear relationship of a next power converter utilization duration versus a wait period following a maximum power converter utilization duration.
Figure 3:
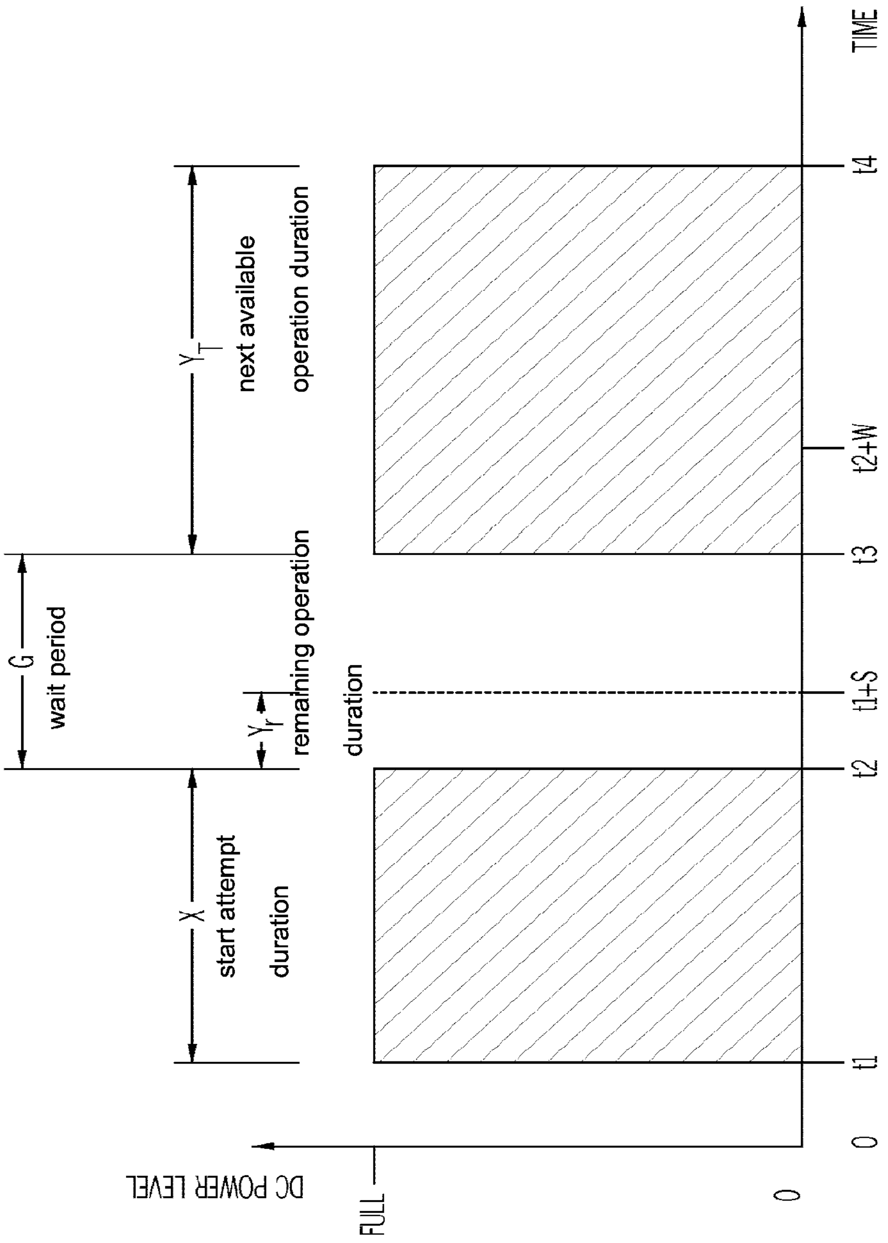
FIG. 3 is a time event graph of power converter utilization indicating the relationships between a previous power converter utilization duration, a wait period, and a next power converter utilization duration.

In more specifically describing the present invention, and as can be appreciated from FIG. 2 and FIG. 3, another embodiment of the present invention provides a mathematical model of the thermal characteristics of a power converter 110. FIG. 2 shows the relationship between a power converter 110 wait period G and a next power converter 110 operation duration $Y_w$ following a maximum power converter utilization duration. The wait period G is defined as the time elapsed since the termination of the most recent operation duration of the power converter 110. In this exemplary embodiment of the present invention, an operation duration of the power converter 110 may be the application of AC power 120 to the generator 130. As can be seen in FIG. 2, the next operation duration $Y_w$ increases until the next operation duration $Y_w$ is equal to power converter 110 rating maximum operation duration S. $Y_w$ being equal to S coincides with the wait period G being equal to the power converter 110 rating minimum wait period W. This relationship may be expressed as $$Y_w=G^*(S/W), \quad (1)$$

where S is in seconds, W is in minutes, G is in minutes, and $Y_w$ is in seconds. Equation (1) is an exemplary embodiment of the present invention describing a linear relationship between $Y_w$ and G. The mathematical relationship of equation (1) may also be expressed in other linear and non-linear equation forms and in associations such as lookup tables.

FIG. 3 shows the relationships between an operation duration X of the power converter 110, a wait period G, the power converter 110 rating maximum operation duration S, and a remaining operation duration $Y_r$ of the power converter 110. According to the definition of the power converter 110 rating, at any point in time during an operation duration the remaining operation duration is the difference between the power converter 110 rated maximum operation duration S and the value of the operation duration X. This can be expressed as $$Y_r=(S-X), \quad (2)$$

where S, X, and $Y_r$ are all in the same time units, typically seconds.

At any point in time during the wait period G the total next operation duration may be expressed as the sum of $Y_w$ and $Y_r$, which, according to equations (1) and (2), may be expressed as $$Y_T=Y_r+Y_w=[(S-X)+G^*(S/W)], \quad (3)$$

where $Y_T$ is the next available power converter operation duration in the same time units as $Y_r$ and $Y_w$. Equation (3) is applicable at any point in time during a power converter 110 utilization as shown in FIG. 3 with the limitations $0 \le X \le S$ and $0 \le Y_T \le S$. X and G may be included in the power converter 110 operation data. $Y_T$ may be included in the operation parameters of the power converter 110. Note: If $G \ge G_{MIN}$, then $Y_T=S$, otherwise $Y_T$ is given by Equation (3). $G_{MIN}$ is the is the minimum wait period required in order for $Y_T$ to reach its maximum value of S.

$$G_{MIN}=(S-Y_T)^*(W/S) \quad (4)$$

Figure 5:
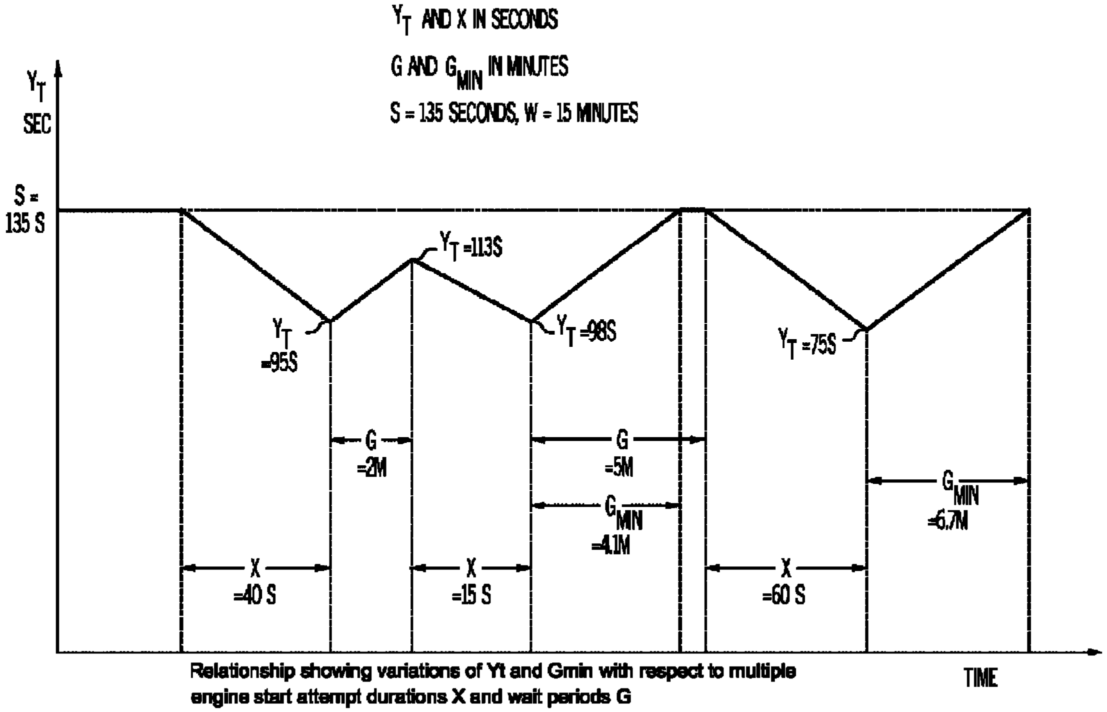
FIG. 5 is a time event graph showing the variation of a next available power converter operation duration with respect to the previous engine start attempt durations and wait periods.

Equations (3) and (4) have been used to develop FIG. 5 which shows the variations of $Y_T$ and $G_{MIN}$ with respect to multiple engine start attempt durations X and wait periods G. It should be noted that the value of $Y_T$ is calculated based on the previous start attempt durations and wait periods in accordance with equation (3) and $G_{MIN}$ is calculated in accordance with equation (4). The value of $Y_T$ increases as the wait period increases until the wait period equals the minimum wait period $G_{MIN}$, at which point $Y_T$ reaches its maximum value of S.

Figure 4:
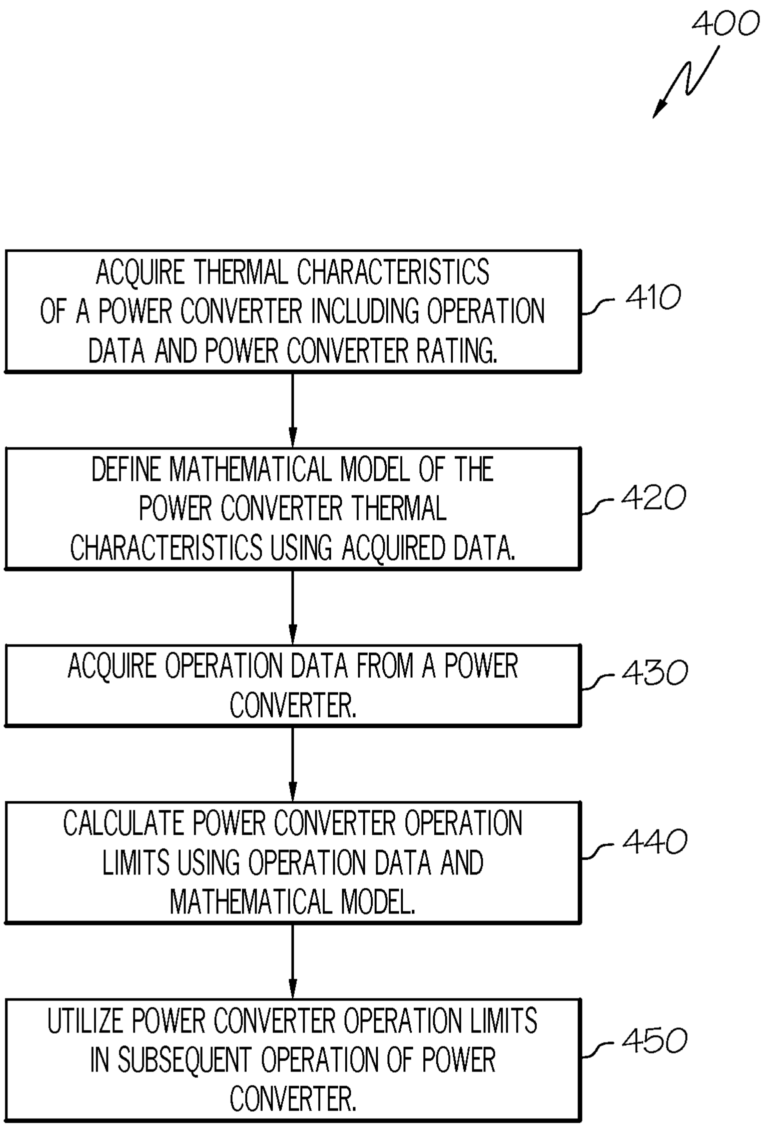
FIG. 4 is a flow chart illustrating a method for determining the operation limits of a power converter for a subsequent utilization of the power converter according to the present invention.

In more specifically describing the present invention, and as can be appreciated from FIG. 4, another embodiment of the present invention provides a method 400 for optimal utilization of a power converter 110. A step 410 of acquiring thermal data of a power converter 110 may comprise acquiring empirically obtained data as well as published data. A step 420 of defining a mathematical model 185 of the thermal characteristics of the power converter 110 may include rigorous statistical and other mathematical analysis of the data of step 410. The mathematical model 185 may be a function of any number of input variables including power converter 110 operation data and power converter 110 ratings. An example of a mathematical model 185 of the thermal characteristics of a power converter 110 is equation (3). The mathematical model 185 may calculate any number of output variables including a next operation duration, a wait period G, or some combination of operation durations and wait periods G. A step 430 may include obtaining sufficient operation data of the power converter 110 for the mathematical model 185 of step 420. A step 440 may include utilization of the mathematical model 185 of step 420 and the operation data of step 430 in order to calculate operation parameters for subsequent utilization of the power converter 110. A step 450 may include the utilization of the operation parameters of step 440 in the subsequent utilization of the power converter 110.

It should be understood, of course, that the foregoing relates to exemplary embodiments of the invention and that modifications may be made without departing from the spirit and scope of the invention as set forth in the following claims.

We claim:

1. A method of utilizing a power converter to start an aircraft engine, the method comprising:

acquiring thermal characteristics data of said power converter during operation;

developing a mathematical model based on said thermal characteristics data;

acquiring measured operation data of said power converter and known operation limits of said power converter, said measured operation data including durations of one or more start attempts of said power converter, wherein said power converter applies power to a generator during said one or more start attempts, and one or more wait period durations after termination of each of the one or more start attempts; and utilizing said mathematical model and said measured operation data for calculating operation parameters for subsequent operations of said power converter, said calculated operation parameters including maximum operation durations, during which power is applied by said power converter to said generator, and minimum wait durations after each of the one or more start attempts.

2. The method of claim 1, wherein utilizing said calculated operation parameters in successive operations of said power converter to start the aircraft engine comprises:

applying power from said power converter to said generator during a first start attempt when an engine start mode switch is switched into a START state;

applying power from said generator to the aircraft engine during said first start attempt for a period up to said maximum operation duration;

if the first start attempt is successful, removing power from said generator to the aircraft engine when the engine start mode switch is switched into an ON state; and if the first start attempt is unsuccessful, removing power from said generator to the aircraft engine for the minimum wait period before applying power from said power converter to said generator during a subsequent start attempt.

3. The method of claim 1 wherein said mathematical model comprises linear equations.

4. The method of claim 1 wherein said mathematical model comprises non-linear equations.

5. The method of claim 1 wherein said mathematical model comprises a single equation.

6. The method of claim 1, wherein said mathematical model is expressed as $Y_T=Y_r+Y_w=[(S-X)+G*(S/W)]$, where $Y_T$ equals a total next operation duration, $Y_r$ equals a remaining operation duration in seconds, $Y_w$ equals a next operation duration in seconds, S equals a rated maximum operation duration of the power converter in seconds, W equals a rating minimum wait period of the power converter in minutes, X equals an operation duration of the power converter in seconds, and G equals a wait period in minutes.

7. A system for starting an engine, comprising:

a starter generator connected to said engine;

a power converter configured to supply converted electrical power to said starter generator;

a power supply configured to provide electrical power to said power converter;

a control switch configured to control the application of said converted electrical power to said starter generator;

a measurement device for acquiring operation data of said power converter and known operation limits of said power converter, said measured operation data including successive start attempt durations of said power converter, wherein said power converter applies power to a generator during start attempts of an aircraft engine, and successive wait period durations after termination each of said start attempts;

a mathematical model of the thermal characteristics of said power converter based at least partly on said operation data and used to calculate operation parameters for subsequent operations of said power converter, said calculated operation parameters including maximum starter attempt durations, and minimum wait durations after each of the maximum starter attempt durations, an operation parameters indicator configured to indicate operation parameters of the next operation of said control switch, wherein the operation parameters are at least partly based on thermal characteristics of the power converter and include durations of previous starter attempts of the engine, during which power was applied by said power converter to said starter generator, and a minimum wait duration until a next starter attempt if a previous starter attempt is unsuccessful; and an operation warning indicator configured to indicate the operation of said control switch in excess of the operation parameters.

8. The system of claim 7 wherein said measurement device acquires said operation data from said power converter.

9. The system of claim 7 wherein said measurement device acquires said operation data from said control switch.

10. The system of claim 7 wherein said operation data is acquired by said system controller.

11. The system of claim 7 further comprising a control switch disabler for preventing the operation of said control switch in excess of said operation parameters.

12. The system of claim 7 further comprising a mathematical model of the thermal characteristics of said power converter, wherein the model is expressed as $Y_T=Y_r+Y_w=[(S-X)+G*(S/W)]$, where $Y_T$ equals a total next operation duration, $Y_r$ equals a remaining operation duration in seconds, $Y_w$ equals a next operation duration in seconds, S equals a rated maximum operation duration of the power converter in seconds, W equals a rating minimum wait period of the power converter in minutes, X equals an operation duration of the power converter in seconds, and G equals a wait period in minutes before initiating a start attempt.

13. The system of claim 7 wherein said operation parameters indicator is continually updated at an approximately constant frequency.

14. The system of claim 7 wherein said operation parameters indicator is updated when said operation parameters change.

* * * * *